United States Patent
Osborn et al.

(10) Patent No.: US 9,652,897 B2
(45) Date of Patent: May 16, 2017

(54) COLOR FILL IN AN AUGMENTED REALITY ENVIRONMENT

(71) Applicant: MICROSOFT TECHNOLOGY LICENSING, LLC, Redmond, WA (US)

(72) Inventors: Dan Osborn, Woodinville, WA (US); Shawn Crispin Wright, Sammamish, WA (US); Anatolie Gavriliuc, Kirkland, WA (US); Marc Brinkley, Woodinville, WA (US); Albert Robles, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/749,887

(22) Filed: Jun. 25, 2015

(65) Prior Publication Data
US 2016/0379418 A1    Dec. 29, 2016

(51) Int. Cl.
*G06T 19/20* (2011.01)
*G06T 11/40* (2006.01)
(Continued)

(52) U.S. Cl.
CPC .......... *G06T 19/20* (2013.01); *G02B 27/0172* (2013.01); *G03H 1/08* (2013.01);
(Continued)

(58) Field of Classification Search
CPC combination set(s) only.
See application file for complete search history.

(56) References Cited

U.S. PATENT DOCUMENTS

| 8,467,133 B2* | 6/2013 | Miller ............... G02B 27/017 353/28 |
| 8,730,309 B2 | 5/2014 | Wilson et al. |

(Continued)

FOREIGN PATENT DOCUMENTS

| WO | 2014078037 A2 | 5/2014 |
| WO | 2015077591 A1 | 5/2015 |

OTHER PUBLICATIONS

O'Neill, Ian, "The First Humans on Mars will be Virtual Explorers", Published on: Jan. 22, 2015, Available at: http://news.discovery.com/space/the-first-humans-on-mars-will-be-virtual-explorers-150122.htm.

(Continued)

*Primary Examiner* — Wesner Sajous
(74) *Attorney, Agent, or Firm* — Alleman Hall Creasman & Tuttle LLP

(57) ABSTRACT

A method for operation a head-mounted computing device that includes capturing an image of a three-dimensional environment external to the head-mounted computing device and identifying a surface within the captured image that is eligible for color fill operation, based on similarities in color parameters of contiguous pixels in the captured image. The method further includes receiving a color fill request via user input at the head-mounted computing device, the request being for a predetermined color and performing a color fill operation on the identified surface in response to receiving the color fill request by (a) generating a fill hologram having the predetermined color and a shape that conforms to the shape of the identified surface, (b) displaying the fill hologram in a world-locked manner so as to overlay the identified surface as viewed through the see-through holographic display of the head-mounted display device.

20 Claims, 9 Drawing Sheets

(51) Int. Cl.
*G06T 19/00* (2011.01)
*G06T 11/00* (2006.01)
*G06T 15/00* (2011.01)
*G06T 7/00* (2006.01)
*G09G 5/02* (2006.01)
*H04N 1/60* (2006.01)
*G02B 27/01* (2006.01)
*G03H 1/08* (2006.01)

(52) U.S. Cl.
CPC ............ *G06T 7/0051* (2013.01); *G06T 11/40* (2013.01); *G06T 19/006* (2013.01); *G02B 2027/014* (2013.01); *G02B 2027/0112* (2013.01); *G02B 2027/0138* (2013.01); *G02B 2027/0174* (2013.01)

(56) References Cited

U.S. PATENT DOCUMENTS

| | | | |
|---|---|---|---|
| 8,947,455 | B2 | 2/2015 | Friesen |
| 9,035,970 | B2* | 5/2015 | Lamb ................. G06F 3/14 345/633 |
| 9,091,891 | B2* | 7/2015 | Uehara ............. H04N 13/0235 |
| 2011/0075257 | A1* | 3/2011 | Hua .................... G02B 27/017 359/464 |
| 2012/0050143 | A1* | 3/2012 | Border ................ G09G 3/3611 345/8 |
| 2013/0215132 | A1 | 8/2013 | Fong |
| 2013/0335405 | A1 | 12/2013 | Scavezze et al. |
| 2013/0342564 | A1 | 12/2013 | Kinnebrew et al. |
| 2014/0002472 | A1 | 1/2014 | Sobeski et al. |
| 2014/0002496 | A1 | 1/2014 | Lamb et al. |
| 2014/0049559 | A1 | 2/2014 | Fleck et al. |
| 2014/0225922 | A1 | 8/2014 | Sbardella |
| 2014/0310640 | A1 | 10/2014 | Kim et al. |
| 2015/0254905 | A1* | 9/2015 | Ramsby ............. G06T 19/006 345/419 |
| 2015/0331485 | A1* | 11/2015 | Wilairat ............ G02B 27/0172 345/156 |
| 2016/0026253 | A1* | 1/2016 | Bradski ............... G02B 27/225 345/8 |
| 2016/0091720 | A1* | 3/2016 | Stafford ............ G02B 27/0172 345/8 |
| 2016/0116979 | A1* | 4/2016 | Border .................. G06F 3/013 345/156 |

OTHER PUBLICATIONS

Towne, Rachael, "How to Use Content Aware Fill in Photoshop", Published on : Apr. 8, 2013, Available at: http://www.lightstalking.com/how-to-use-content-aware-fill-in-photoshop/.

Grasset, et al., "Interactive Mediated Reality", In Proceedings of the Sixth Australasian conference on User interface vol. 40, Jan. 2005, 9 pages.

Mark, Nachman, "Hands-on with Microsoft's HoloLens: The 3D Augmented Reality Future is Now" Published on: Jan. 22, 2015, Available at: http://www.pcworld.com/article/2873657/hands-on-with-microsofts-hololens-the-3d-augmented-reality-future-is-now.html.

Visualizer, Published on: Aug. 6, 2014, Available at: http://string.co/usecases/paintvisualiser.

Matkovic, et al., "Dynamic Texturing of Real Objects in an Augmented Reality System", In IEEE Virtual Reality Conference, Mar. 12, 2005, 4 pages.

Saito, S. et al., "Indoor Marker-based Localization Using Coded Seamless Pattern for Interior Decoration", In Proceedings of the 2007 IEEE Virtual Reality Conference, Mar. 10, 2007, Charlotte, North Carolina, 8 pages.

Han, T. et al., "Mixed Reality System for Virtual Interior Design", In International Journal of Smart Home, vol. 7, Issue 3, May 2013, 10 pages.

ISA European Patent Office, International Search Report and Written Opinion Issued in PCT Application No. PCT/US2016/036116, Sep. 23, 2016, WIPO, 11 pages.

IPEA European Patent Office, Second Written Opinion issued in PCT Aplication No. PCT/US2016/036116, Feb. 17, 2017, WIPO, 7 pages.

* cited by examiner

COLOR FILL IN AN AUGMENTED REALITY ENVIRONMENT

BACKGROUND

Several technologies have recently emerged that allow users to experience a blend of reality and virtual worlds. For example, head-mounted display (HMD) devices may include high definition cameras, depth cameras, range finders, gyroscopes, accelerometers, and other technologies that allow the head-mounted HMD device to map the real world and to display on an at least partially see through display virtual objects head-mounted that may be viewed in conjunction with real objects that are visible through the display. This blended view of real-world objects and virtual objects is referred to as augmented reality.

One challenge associated with augmented reality systems is how to afford the user an ability to virtually modify the real environment through the creation and display of holographic content, in an intuitive manner In one particular example, the user may desire to modify the color of a real object. One prior approach involves obtaining geometric data defining the three dimensional shape of the real object, and then using that geometric data to generate a hologram to be displayed in a shape and location indicated by the geometric data, so as to appear to the user to color the real object. However, in many circumstances such three dimensional geometric data is not available, is inaccurate, and or is time consuming to process.

SUMMARY

To address the above issues, a method for operation of a head-mounted computing device is provided. The method may include capturing an image of a three-dimensional environment external to the head-mounted computing device, the captured image including a field of view of a user through a see-through display of the head-mounted computing device, and identifying a surface within the captured image that is eligible for color fill operation, based on similarities in color parameters of contiguous pixels in the captured image. The method further may include receiving a color fill request via user input at the head-mounted computing device, the request being for a predetermined color and performing a color fill operation on the identified surface in response to receiving the color fill request by (a) generating a fill hologram having the predetermined color and a shape that conforms to the shape of the identified surface, (b) displaying the fill hologram in a world-locked manner so as to overlay the identified surface as viewed through the see-through holographic display of the head-mounted display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
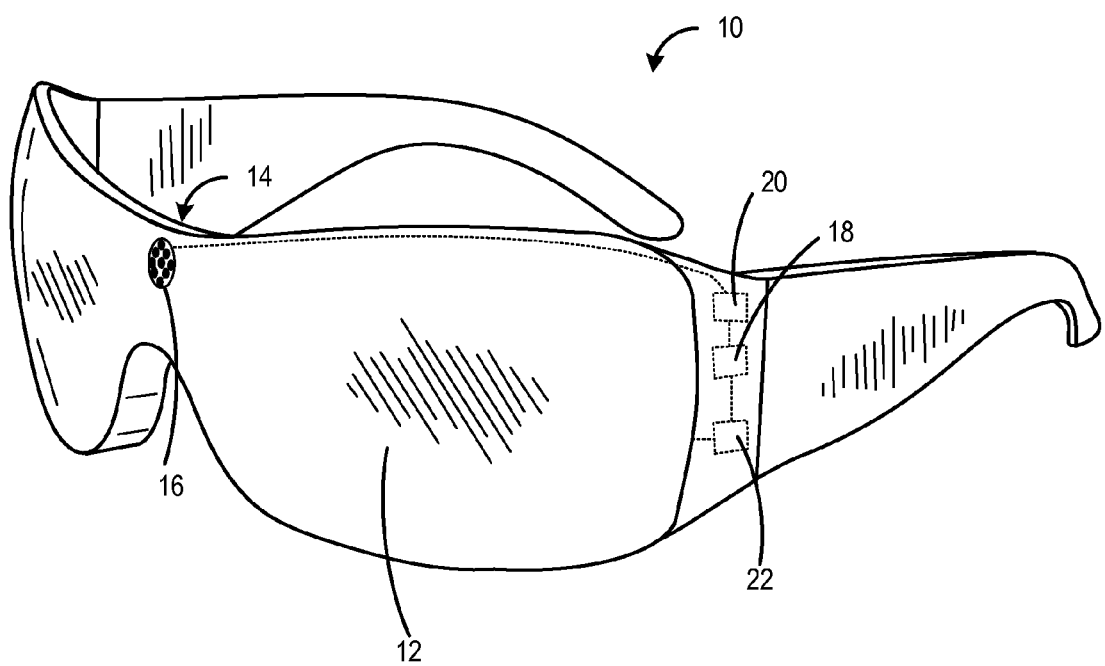
FIG. 1 shows an illustration of a head-mounted computing device according to an embodiment of the disclosure.

FIG. 1 shows an exemplary head-mounted computing device 10 that may be used to implement the augmented reality color fill techniques described herein. The color fill techniques enable fill-eligible surfaces in the real-world to be identified and subsequently holographically filled via a user selected color. This technique may be applied in home improvement, home remodeling, interior design, graphic design, industrial design, and other fields. For instance, a user may wish to repaint a house. The color fill techniques described herein may be used to enable a user to quickly test a variety of proposed colors in an augmented reality environment. In this way a user can visually perceive an envisioned color scheme in an augmented reality environment, enabling a user to try out, compare and contrast, etc., various colors in their home environment without committing to physically painting surfaces in the home environment. As a result, a user may be more content with their final paint selection decision, thereby improving user satisfaction.

Specifically, FIG. 1 illustrates a head-mounted computing device 10 according to an example of the present disclosure. In this example, the illustrated head-mounted computing device 10 takes the form of wearable glasses or goggles, but it will be appreciated that other forms are possible. The head-mounted computing device 10 includes an at least partially see-through holographic display 12 that may be configured to visually augment an appearance of a physical environment being viewed by the user through the see-through holographic display. The holographic display 12 is at least partially see through in that it contains a region that is optically clear (i.e., transparent) and can pass light through to the users eyes. Typically, the holographic display is optically clear across its entire surface. However, the holographic display may also contain opaque regions, for example around the edges or at the periphery of the user's field of view, through which light cannot pass, which may be useful for example in hiding internal electronics. The see-through holographic display 12 may be configured to present holographic images within the real-world environment seen by the user through the display. Thus, the holographic images may be presented in a user interface overlying the real-world environment seen through the display. Although primarily described in the context of augmented reality system, the techniques described herein may alternatively be utilized in a full virtual reality system. Thus, in an alternative embodiment, the head-mounted computing device may contain a virtual reality display that is entirely opaque and a forward facing optical sensor configured to capture an image of the environment and display it on the opaque display, and the holographic images described herein may alternatively be images overlaid on this opaque display.

The head-mounted computing device 10 may include an image production system 22 that is configured to display virtual objects to the user with the see-through holographic display 12. The virtual objects are visually superimposed onto the physical environment so as to be perceived at various depths and locations. It will be appreciated that the virtual objects may be included in a user interface. The head-mounted computing device 10 may use stereoscopy to visually place a virtual object at a desired depth by displaying separate images of the virtual object to both of the user's eyes. However, the particular method of imparting a perception of depth to the holograms need not be so limited, as numerous holographic display techniques that provide depth perception have been contemplated.

The head-mounted computing device 10 includes an optical sensor system 14 that may include one or more optical sensors. In one example, the optical sensor system 14 may include an outward facing optical sensor 16 that may be configured to detect the real-world background (i.e., environment) from a similar vantage point (e.g., line of sight) as observed by the user through the see-through holographic display 12. The optical sensor system 14 may include a variety of types of optical sensors, such as a depth camera and an RGB camera, which may be a high definition camera or have another resolution. In one embodiment, the optical sensor system outputs an RGB image, and in another embodiment, the optical sensor system outputs a depth encoded RGB image. Various other output formats are possible.

The head-mounted computing device 10 may further include a position sensor system 18 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 14 may be used to capture an image of a three-dimensional environment external to the head-mounted display. Specifically, the captured image can include a field of view of a user through the see-through head-mounted display 12. In another example, the optical sensor information may also include camera field of view that may include an image from an image capturing camera which may be larger than the display field of view. In some implementations, the camera field of view may be a totality of previously captured and reconstructed image areas. For example, while the user moves their head the camera is continuously capturing the images around the user, so the device will have a much bigger reconstructed (or "remembered") captured three-dimensional environment. Therefore, the area selection process described in greater detail herein may not be limited by any specific field of view. In some implementations this reconstructed three-dimensional environment may also be downloaded by the device from the cloud and subsequently updated from cameras as the user moves around.

Furthermore, the optical sensor information and the position sensor information may be used by the head-mounted computing device to perform analysis of the real-world background, such as depth analysis, surface reconstruction, environmental color and lighting analysis, or other suitable operations. For instance, optical sensor information, depth sensor information, and/or position sensor information may be used by the head-mounted computing device 10 to identify surfaces in the real-world environment. In one particular example, indoor surfaces such as walls, ceilings, floors, moldings, cabinets and/or objects, etc., may be identified by the head-mounted computing device 10. It will be appreciated that the indoor surfaces may be identified for use cases involving indoor painting or interior design. Additionally, optical and position sensor information may be used to create a virtual model of the real-world background to enable a holograms to be generated at desired locations in the real-world environment, for instance.

An audio sensor system 20 may also be included in the head-mounted computing device 10. The audio sensor system 20 may include one or more microphones configured to receive audio input, such as audio commands from a user.

Figure 2:
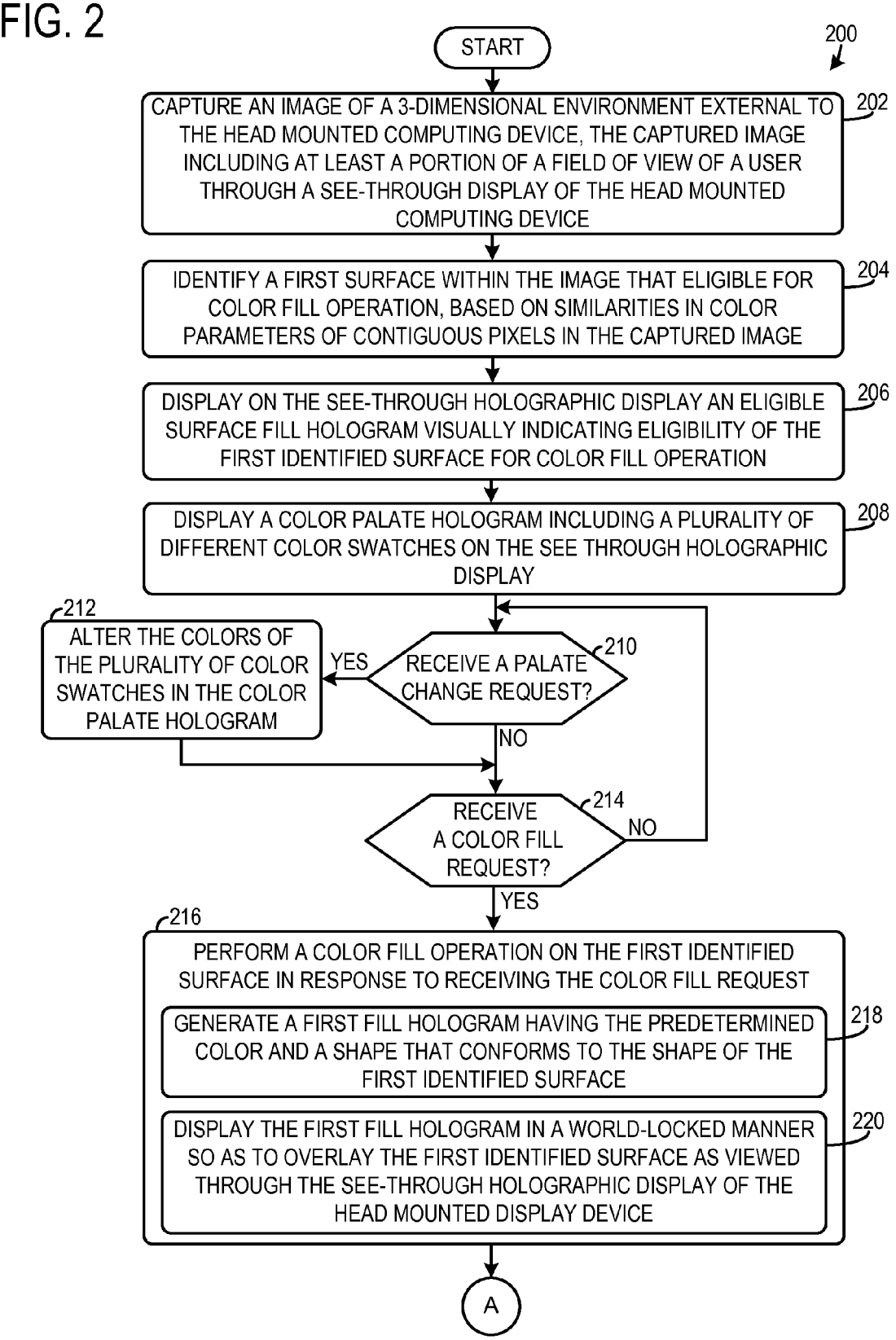
FIGS. 2-3 shows a method for operation of a head-mounted computing device.
Figure 3:
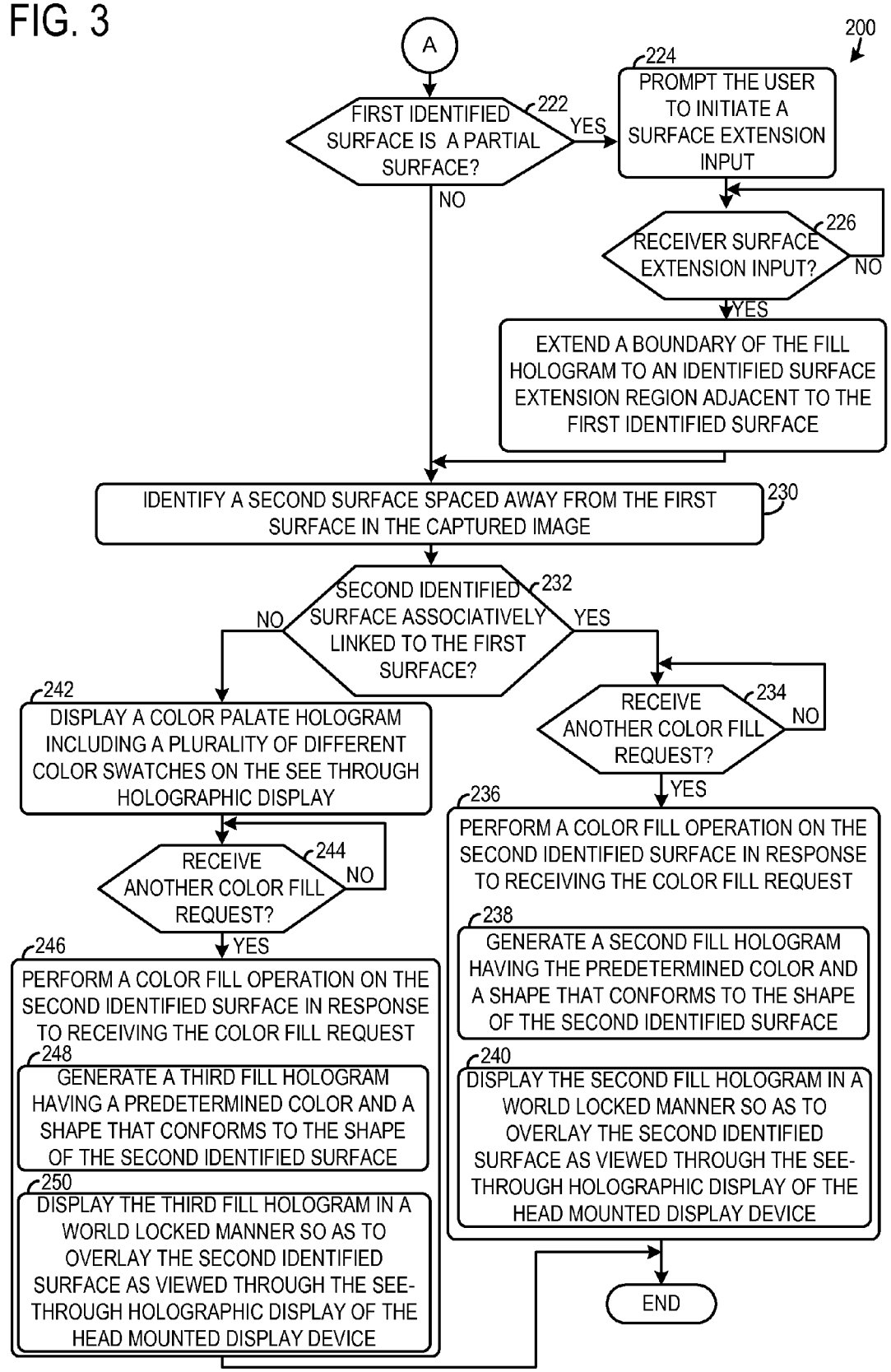

FIGS. 2 and 3 show a method 200 for operation of a head-mounted computing device. The method 200 may be implemented via the head-mounted computing device 10 discussed above with regard to FIG. 1 or another suitable head-mounted computing device. The method 200 enables a color fill operation in which a real world surface viewed through the see-through display is colored with a fill hologram at the user's command. In this manner, a user can quickly change a color of a real world object according to their desire, enabling a user to test different colors in their surroundings using augmented reality techniques. Such a color fill feature has broad reaching applicability to a number of different fields in which a user may desire to envision color changes to interior and exterior surfaces and objects, such as construction, home improvement, interior design, graphic design, etc.

At 202, the method includes capturing an image of a three-dimensional environment external to the head-mounted computing device, the captured image including at least a portion of a field of view of a user through a see-through display of the head-mounted computing device. It will be appreciated that the image may be captured via the optical sensor system 14. For instance, one or more cameras may be used to capture the image.

Next, at 204, the method includes identifying a first surface within the image that is eligible for a color fill operation, based on similarities in color parameters of contiguous pixels in the captured image. The color parameters may include hue, brightness, and/or saturation. In one example, identifying the first surface may include determining a variance in one or more of the color parameters across a region in the captured image and the surface may be identified based on a variance threshold. It will be appreciated that the optical sensor system may sense non-visible as well as visible light. Accordingly, the color parameters may include parameters indicating non-visible light, such as infrared and ultraviolet light. Further, it will be appreciated that an optical sensor system may be provided that outputs grayscale images, and thus the term color parameters as used herein encompasses color parameter values that form grayscale images, as well as color images.

For instance, if the hues of adjacent pixels differ from each other by greater than a threshold variance then it may be determined that the pixels are not included in the same surface. Conversely, if the hues of adjacent pixels do not differ from each other by greater than a threshold variance then it may be determined that the pixels are included in the same surface. In one example, the threshold variance for hue may be 10%. This comparison can be made by starting with a first pixel in the captured image, and then comparing other pixels bordering the first pixel for hue difference within the threshold. If the bordering pixels are within the threshold, they can be deemed to be as belonging to the same surface. This processes can continue for pixels that border each of the pixels that bordered the first pixel, and so on and so forth until the edge of the image is reached or until all the threshold variance has been exceeded by all edge pixels of an identified surface. The result will be a surface defined by a set of pixels that are contiguous and have a hue within the threshold variance.

This type of threshold variance calculation may also be applied to the other color parameters. For instance, the brightness of adjacent pixels may be identified and it may be subsequently determined if the brightness of adjacent pixels differ by greater than a threshold brightness then it may be determined that the pixels are not included in the same surface, in the manner described above for hue. The threshold variance for brightness may be 50% in one specific example. Further, it will be appreciated that luminance or intensity may also be used as another measure of brightness. Additionally, the saturation of adjacent pixels may be identified and it may be subsequently determined if the saturation of adjacent pixels differ by greater than a threshold saturation then it may be determined that the pixels are not included in the same surface. The threshold variance for saturation may be 40%-60%, for example.

In one particular example, each of hue, brightness, and saturation may be taken into account when determining surface classification of pixels in the image. However, in other examples only a portion of the aforementioned color parameters may be taken into account when determining surface classification of the pixels. Further in one example, the color parameters may be weighted with regard to pixel classification. Additionally, color histograms may be used to express the distribution of the aforementioned color parameters, with binning of the values for each color parameter into the desired ranges above. Further in one example, depth information (e.g., pixel depth information) may also be taken into account when determining fill-eligible surfaces, in one example. For instance, depth data may be used to determine a boundary of region of interest within the image in which the fill-eligible surface may lie, and then the color comparison described above may be performed on pixels within that region of interest. In another example, only depth data may be used for pixel classification. For instance, a flat region may be identified based on the variance in depth data. Further in some examples, small areas that are not similar in color may also be included in a classified surface. For example, small blemishes on a wall may be included in a wall surface. In another example, the classified surface having a similar color may be expanded to overlap an edge region of the classified surface or may be contracted to leave room for the edge region. Pixel classification based on color parameters may also be determined by other methods, for example by machine learning algorithms.

Next, at 206, the method includes displaying on the see-through holographic display an eligible fill surface hologram visually indicating eligibility of the first identified surface for color fill operation. For instance, the boundary and/or interior of the fill-eligible surface may be distinguished via a holographic image overlying the boundary and/or interior surface. Such a holographic image may have a predetermined color. In other examples, an animation, such as a wave propagating to the edge of the fill-eligible surface, may be used to indicate fill eligibility. In other examples, the eligible fill surface may not be marked in any form.

At 208, the method includes displaying a color palate hologram including a plurality of different color swatches on the see-through holographic display. In this way, a user can view a plurality of possible fill colors. In one example, the color swatches may have predetermined colors. The predetermined colors may correspond to predetermined paint colors sold by a paint manufacturer, and may be labeled with textual names or numeric identifiers. In such a user case, a user can quickly view a color palate corresponding to actual paint colors that are commercial available. It will be appreciated that a color may be included in a pattern having two or more colors, and the fill functionality described herein may enable an identified fill-eligible surface to be filled with a pattern of two or more colors. Therefore, the color swatches may include patterns, in some examples. However, in other examples the color palate hologram may not be displayed, and a different mechanism, such as a voice command, may be provided for selecting a color or pattern for the fill operation.

At 210 the method includes determining if a color palate change request is received. If a color palate change request is not received (NO at 210) the method advances to 212. At 212 the method includes altering the colors of the plurality of color swatches in the color palate hologram. In this way, a first color palate may be swapped out with a more desirable second color palate. For instance, a user may wish to quickly flip through several predetermined colors palates prior to selecting a fill color. As a result, a user's color fill options can be expanded. Further, with such a color palate change request, surfaces within the three-dimensional environment that have already been painted with different colors in the first color palate, will change to corresponding different colors in the second color palate. In this manner, the user may explore changes in the entire palate in which an environment is colored without individually re-coloring the surfaces. It will further be appreciated that the color palates may be user-generated or downloaded from curated server side sources, such as paint manufacturers, interior designers, etc. Colors or patterns in the color palate may also be captured by the user from the real world, for example, by receiving an image from a camera or stored image source, receiving a user selection of a pixel or region of pixels in the image, and identifying the color in those pixel(s). Using such a tool, as one example, a user may select a color from a first wall using the color picking functionality of the tool, and may virtually apply the identified color from the first wall to another wall of a different color. Yet another color palate implementation may include gradients, in which one color changes into another color. These may be selected by the user to display a virtual color gradient across a surface.

However, if a color palate change request is not received (YES at 210) the method advances to 214. At 214 the method includes determining if a color fill request has been received. It will be appreciated that the color fill request is a request to fill the first identified surface. The color fill request may be an optically sensed gesture, a touch gesture sensed via a touch surface, a voice command, a keyboard input, a mouse input, etc. For instance, a user may select a color swatch from the color palate via a hand gesture. However, in other examples the user may utter a voice command such as "color red" or "color manufacturer A 3410."

If it is determined that a color fill request has not been received (NO at 214) the method returns to 210. However, if it is determined that a color fill request has been received (YES at 214) the method advances to 216. At 216 the method includes performing a color fill operation on the first identified surface in response to receiving the color fill request. In this way, a selected surface in the three-dimensional environment can be quickly filled with a predetermined color via user selection. As a result, a user can fill surfaces in their surrounding environment with a virtual color to adjust the augmented reality environment viewed through the see-through holographic display according to their desire.

Performing the color fill operation may include steps 218-220. At 218, the method includes generating a first fill hologram having the predetermined color and a shape that conforms to the shape of the first identified surface. At 220, the method includes displaying the first fill hologram in a world-locked manner so as to overlay the first identified surface as viewed through the see-through holographic display of the head-mounted display device. In one example, the fill hologram may be colored such that it covers up a surface viewed in the real world environment. For instance, a room may have smudges on a white wall. The fill hologram may be configured to cover up the smudges by presenting a white color over the smudges. Thus, the fill hologram color may match the color of the environmental surface surrounding the identified surface. In this way, the smudges can be essentially hidden in the augmented reality environment.

Now referring to FIG. 3, at 222 the method includes determining if the first identified surface is a partial surface. The first identified surface may be classified as a partial surface based on a variety of parameters such the boundary of the surface, the color parameters of the surface, the size of the surface, the geometry of the surface, depth data related to the surface, etc. For instance, a user's field of view may only span a portion of a wall of a room. This portion of the wall may be identified as a partial surface as follows. First, the color comparison algorithm described above may be used to search for pixels that have a color parameter within the threshold variance as described above, and if a surface is found that is completely bordered by a boundary (perimeter) beyond which the pixels are greater than the threshold variance, then the surface may be defined as complete. However, in cases where the boundary defined by the color parameter variance is incomplete, i.e., does not completely surround a surface, but rather intersects an edge of the field of view of the image, then the surface may be identified as a partial surface. As another example, a surface may be identified using the color parameter variance methods described above as being completely surrounded by a boundary, but additional data sources may suggest that the surface extends further, such as depth camera data that indicates that the surface actually extends further, or geometrical properties such as a surface that is determined to be a ceiling being generally known to extend continuously to the walls that support the ceiling. In such cases, such depth camera data and geometrical properties may be used to define the surface as a partial surface which should extend further.

If it is determined that the first identified surface is a partial surface (YES at 222) the method advances to 224. A partial surface may be identified via color parameter, depth information, fill-eligible surface boundary size and/or contour, etc. For instance, as briefly described above, the surface may be identified as a partial surface when a current field of view of the display only encompasses a portion of an entire surface, such as wall, floor, etc.

At 224, the method includes prompting the user to initiate a surface extension input. Prompting the user to initiate a surface extension input may include visual cues, audio cues, etc. For instance, an arrow and/or text may be holographically displayed in the user's field of view to encourage them to look at an upper portion of a wall surface when only a lower portion of the wall surface that is currently in view. Audio cues, such as directional phrases (e.g., "look up"), may also be provided to encourage the user to trigger surface extension. In this way, a user can be encouraged to change their perspective that can enable the entire fill-eligible surface to be identified and color filled.

Next, at 226, the method determines if a surface extension input is received. The surface extension input may include a user input such as a gesture command, a voice command, etc., and/or a change in orientation of the head-mounted display (i.e., a field of view adjustment). For instance, a user may change the field of view of the display through head movement and gesturally select an extended region of the identified surface. It will be appreciated that the extended region may be identified via the optical sensors system, in such an example. Still further in another example, the boundary of the partial surface may be automatically extended in response to a change in the field of view of the holographic display. Thus, as the user views more and more of the partial surface, the surface is extended, until ultimately the entire surface is identified by the method.

If it is determined that a surface extension input has not been received (NO at 226) the method returns to 226 to wait for such an input. However, in some example the method may advance to step 230 when it is determined that a surface extension input has not been received.

However, if it is determined that a surface extension input has been received (YES at 226) the method advances to 228 where the method includes extending a boundary of the fill hologram extending a boundary of the fill hologram to an identified surface extension region adjacent to the first identified surface. It will be appreciated that the identified surface extension region and the first region of the identified surface may be considered the first identified surface at this juncture.

However, if it is determined that the first identified surface is not a partial surface (NO at 222) the method advances to 230 where the method includes identifying a second surface spaced away from the first surface in the captured image.

At 232, the method determines if the second identified surface is associatively linked to the first surface. This determination may be calculated based on color parameters and depth data of corresponding to pixels in the captured image of the real world environment, as well as geometric properties of the first and second surfaces that suggest they should be linked. For instance in an interior painting use-case surfaces such as walls, floors, trim, cabinets, etc., having similar colors may be identified as being associatively linked. Also, the geometric position of floor trim as being at the intersection of floor surfaces and wall surfaces may cause the system to link all floor trim as belonging to a class of floor trim surfaces. Similar definitions may be used to identify ceiling trim, wainscoting, window trim, door trim, etc. Vertical walls defining a room or hallway may also be linked together.

If it is determined that the second identified surface is associatively linked to the first identified surface (YES at 232) the method proceeds to 234. At 234 the method determines if another color fill request is received. The color fill request may include any suitable user input(s) such as hand gestures, touch gestures, mouse inputs, keyboard inputs, voice commands, etc. In one example, a user may be prompted by visual and/or audio cues to input a color fill request to fill the second surface with the same color as the first surface. In this way, a user can be notified of corresponding surface which they may want to fill with a similar color. Further, instead of an explicit notification, programmatically performing another color fill request for an associated surface may also be enabled according to a user setting. Therefore, subsequent color fill requests for corresponding surfaces may be performed programmatically according to the user setting, without necessitating direct user input.

If another color fill request is not received (NO at 234) the method returns to 234. However, if another color fill request is received (YES at 234) the method advances to 236 that includes performing a color fill operation on the second identified surface in response to receiving the color fill request. Performing a color fill operation on the second identified surface in response to receiving the color fill request may include steps 238-240. At 238 the method includes generating a second fill hologram having the predetermined color and a shape that conforms to the shape of the second identified surface and at 240 the method includes displaying the second fill hologram in a world-locked manner so as to overlay the second identified surface as viewed through the see-through holographic display of the head-mounted display device. In this way, corresponding surfaces can be quickly identified and virtually painted a similar color. For instance, a user may wish to virtually paint the walls or trim in a room a similar color. Therefore, steps 234-240 enable corresponding surfaces to be quickly filled responsive to a user's fill request.

However, if it is determined that the second identified surface is not associatively linked to the first identified surface (NO at 232) the method proceeds to 242 where the method includes displaying a color palate hologram including a plurality of different color swatches on the see-through holographic display. In this way, a user can be provided with a variety of surface fill colors to choose from. However, in other examples the color palate hologram may not be displayed. It will be understood that although the color palate hologram is introduced at this point in the method flow, it could alternatively be introduced at virtually any other point, and the user could be provided an opportunity to change color palates.

At 244, the method determines if another color fill request is received. The color fill request may include a multitude of suitable user input(s), as previously discussed. If another color fill request is not received (NO at 244) the method returns to 244. However, if another color fill request is received (YES at 244) the method advances to 246 where the method includes performing a color fill operation on the second identified surface in response to receiving the color fill request. Performing a color fill operation on the second identified surface in response to receiving the color fill request may include steps 248-250. At 248, the method includes generating a third fill hologram having a predetermined color and a shape that conforms to the shape of the second identified surface and at 250 the method includes displaying the third fill hologram in a world-locked manner so as to overlay the second identified surface as viewed through the see-through holographic display of the head-mounted display device. It will be appreciated that the predetermined color in step 248 may be different from the predetermined color discussed in step 218.

FIGS. 4-8 show an exemplary use case where surfaces in a real world three-dimensional environment are filled via holographic overlays in response to a user fill request. The holographic overlays, referred to as fill holograms, are world-locked to the corresponding surfaces. That is to say that the fill hologram occludes the identified surface even when the user's perspective changes. In this way, when a user's perspective changes, altering the field of view of the head-mounted holographic display, the fill hologram will adjust to the change in perspective to enable the entire surface to remain virtually painted with a fill hologram. In this way, the user can virtually change the color of a desired surface in the augmented reality environment, enabling a user to visually experience contemplated color changes virtually applied to the surrounding environment. For example, a user may wish to repaint a room in a house.

Initially a user may select a number of predetermined color palates which may correspond to color palates downloaded from data sources provided by paint manufacturers and corresponding to commercially available paint colors, for instance. A user may then select one or more color for filling selected walls, objects, etc., and a holographic color fill overlay can then be applied to the wall, object, etc., in response to the selection. In this way, a user can view surfaces in a room, such as walls, with colors envisioned by the user. Consequently, a user can experience the room in a variety of colors and select the most desirable color(s) for subsequent painting. As a result, the user can experiment with different colors without committing to physically painting the room. Therefore, the user may be more content with the color chosen for painting and may be less likely to repaint, thereby improving user satisfaction, and controlling costs.

FIGS. 4 and 6-8 shows a user 400 wearing the head-mounted computing device 10 that includes a see-through holographic display, as previously discussed. A field of view 402 of the see-through holographic display in a real-world three-dimensional environment 404 is also illustrated in FIGS. 4 and 6-8.

Figure 4:
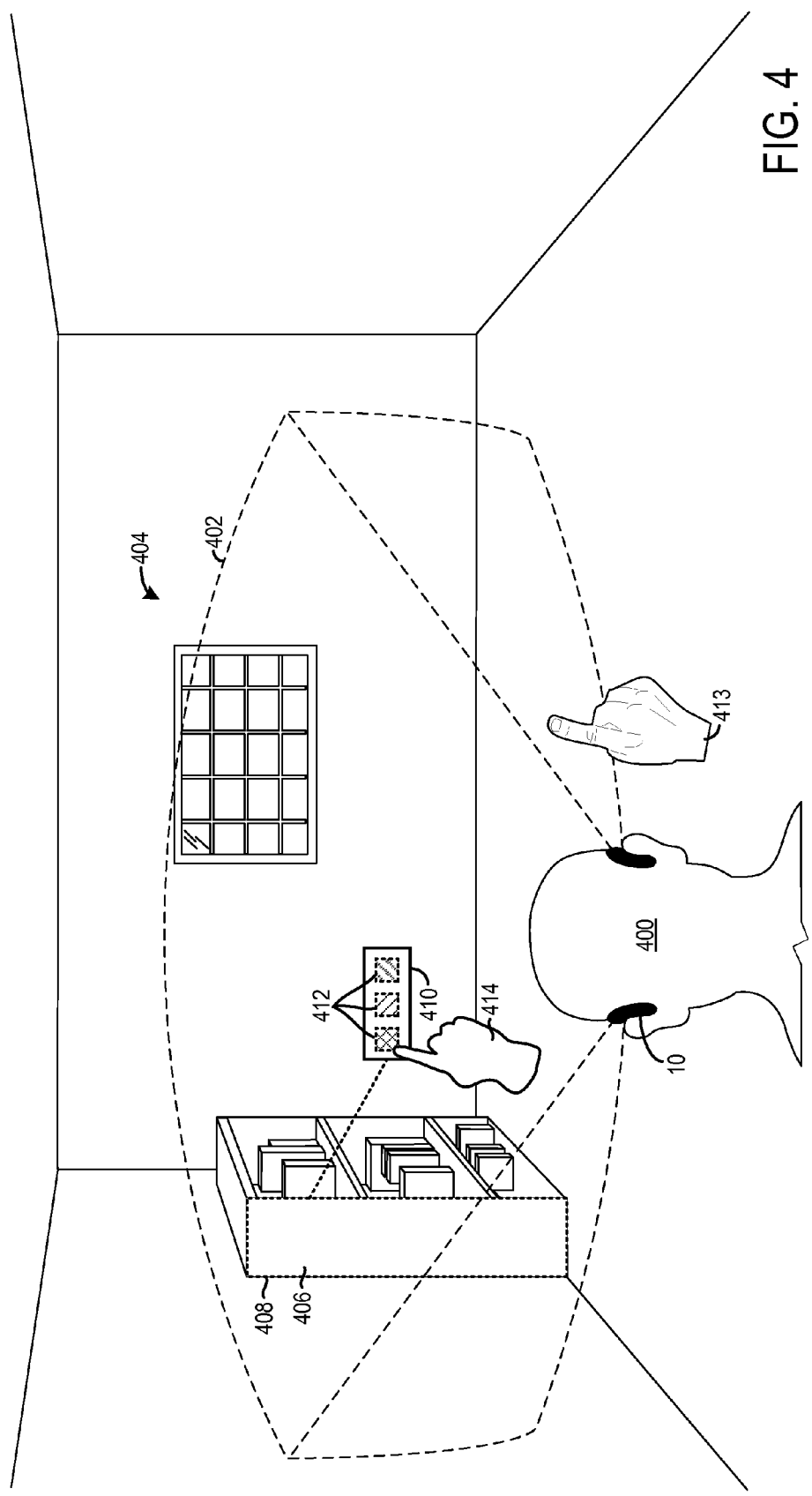
FIGS. 4-8 show an exemplary use case scenario for performing color fill operations on surfaces in the augmented reality environment.

A fill-eligible surface 406 in the real-world three-dimensional environment 404 is illustrated in FIG. 4. It will be appreciated that the head-mounted computing device 10 is configured to identify the fill-eligible surface 406 in an image of the real-world three-dimensional environment 404. As previously discussed, the fill-eligible surface may be identified based on one or more of the following color parameters: hue, brightness, and saturation. As previously discussed, variance thresholds for the aforementioned color parameters may be used in such a calculation. Moreover, depth data related to pixels in the image may be used to determine fill-eligible surfaces, in some examples.

Figure 5:
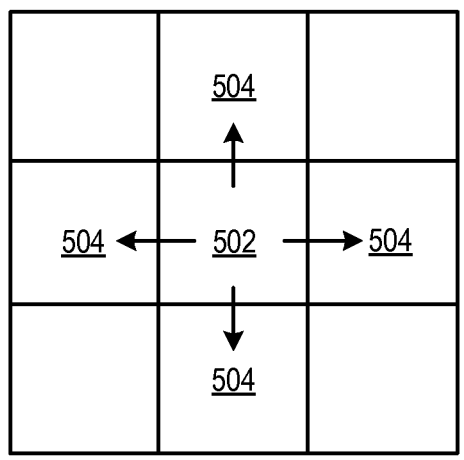

FIG. 5 shows an exemplary pixel map 500 that may be included in a continuous fill-eligible surface 406. Although only nine pixels are illustrated in FIG. 5, it will be appreciated that the comparative pixel technique discussed with regard to FIG. 5 may propagate across a large number of pixels in a captured image. It will be appreciated that the pixel map may take other forms, in other examples.

As previously discussed, color parameters of a starting pixel 502 may be compared to adjacent pixels 504 to determine if the pixels are included in a fill-eligible surface. Comparing the starting pixel 502 with the adjacent pixels 504 may include determining if the variance in one or more of hue, brightness, and saturation of comparative pixels is less than a predetermined variance threshold. If the variance(s) are less than the variance threshold(s) the pixels are less than the variance threshold(s) the comparative pixels are determined to be in a single fill-eligible surface. In this way, the captured image can be partitioned into different surfaces.

In some examples, the variance thresholds of each of the color parameters may vary across a pixel map. For instance, the variance threshold of pixels may increase as the distance between a central pixel and comparative pixels increases. Thus, a variance function may be employed to determine how the variance threshold changes throughout the color parameter variance computation to define a particular surface. The variance function may take into account the average color parameter value of all pixels identified in the surface, as one example, and may permit a higher variance across larger distances in another example. Using color parameters to determine fill-eligible surfaces enables a quick and efficient algorithm to be used to distinguish between different surfaces in an image. As a result, the image can be quickly divided into different fill-eligible surfaces for downstream fill operation. The color variance described above may be a "rolling" or "local" variance. That is to say that the variance of nearby pixels may be compared to one another instead of the variance between a first pixel and a second pixel spaced away from the first pixel.

Returning to FIG. 4, a fill-eligible hologram 408 indicating the fill eligibility of the fill-eligible surface 406 is portrayed. In the depicted example, the fill-eligible hologram 408 denotes the boundary of fill-eligible surface 406. However, numerous types of fill-eligible holograms have been contemplated. For instance, the whole surface 406 or other portion of the surface other than the boundary may be highlighted via a distinguishable color. In another example, the fill-eligible hologram 408 may be an animation propagating to the edges of the fill-eligible surface 406. In other examples, the eligible fill surface may not be marked in any form.

In response to identifying the fill-eligible surface 406 a color palate hologram 410 can be displayed. The color fill hologram 410 includes a plurality of different color swatches 412, each of the color swatches having a different predetermined color. For instance, the color swatches may correspond to color swatches of a paint manufacturer in the context of house painting. In another example, one or more of the different color swatches 412 may be a color in the real world environment selected by the user.

A user's hand 413 implements a gesture that selects one of the color swatches in the color fill hologram 410. A graphical representation 414 of the user's hand 413 may be presented as a hologram by the device 10 to enable a user to select distant objects in the augmented reality environment. However, it will be appreciated that the user may select a desired color swatch in other ways, such as voice commands, keyboard commands, etc.

Figure 6:
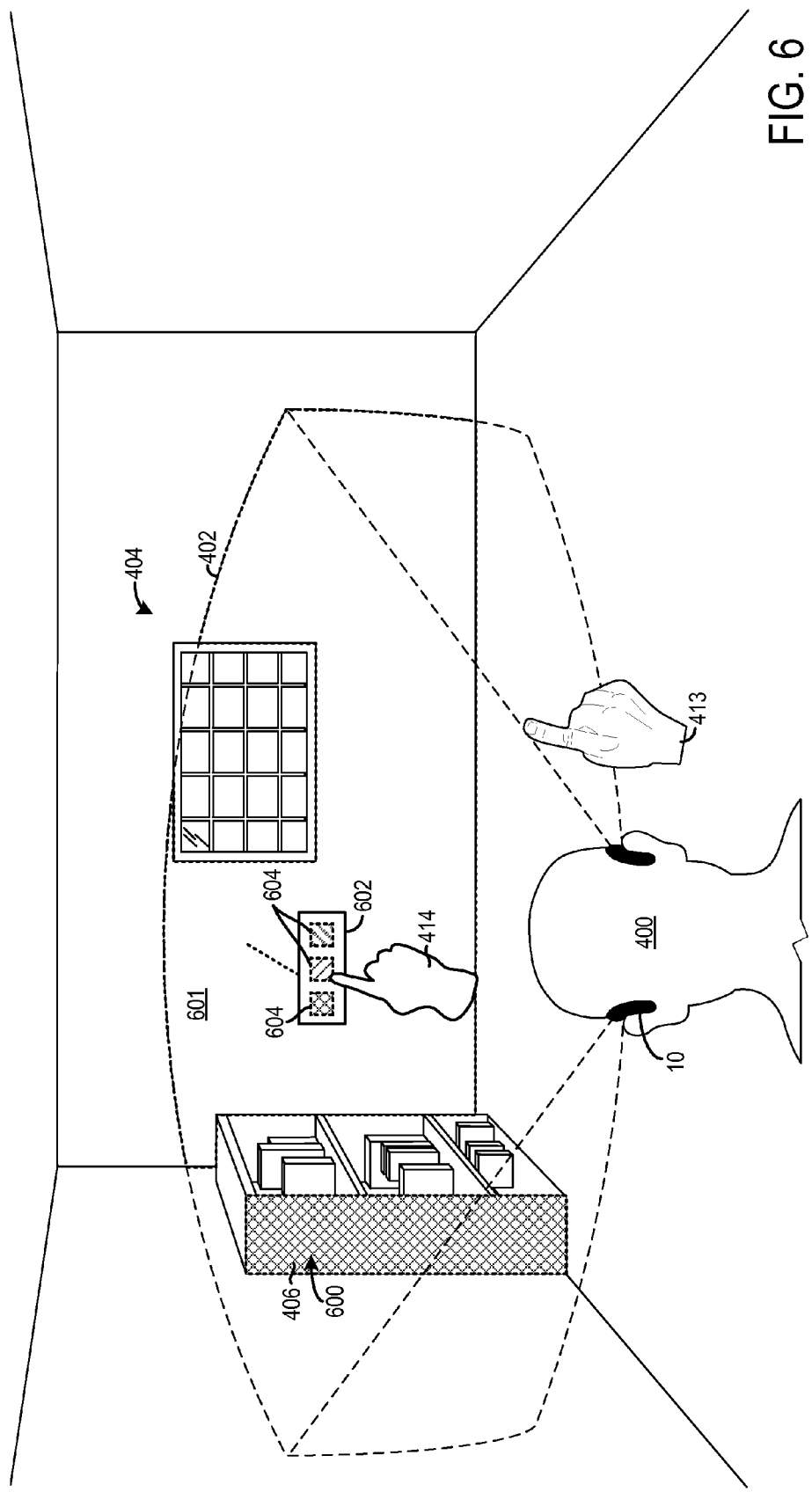

FIG. 6 shows the fill-eligible surface 406 filled with the color corresponding to the color swatch selected by the user 400 in FIG. 5. The color fill operation may be carried out via a fill hologram 600 having the predetermined color selected by the user in FIG. 5 and a shape that conforms to the shape of the fill-eligible surface 406 such that the hologram overlays the fill surface. Furthermore, the fill hologram 600 is displayed in a world-locked fashion where the hologram will conform to the shape of the surface when the user changes their perspective. In this way, the position of the fill hologram 600 is locked to the fill-eligible surface 406 while the user's perspective changes. Therefore, adjustment of a change in the user's perspective does not affect the underlying surface occluded by the fill hologram. As a result, the surface can be perceived via a color change, enabling a user to test color variation in their surrounding environment.

Another fill-eligible surface 601 is shown in FIG. 6. It will be appreciated that the fill-eligible surface 601 may be identified via the color parameter identification techniques described above. Another color palate 602 presented in the field of view 402 of the device 10 is depicted in FIG. 6. It will be appreciated that the color palate 602 may be presented in response to identification of the fill-eligible surface 601. The color palate 602 includes a plurality of different selectable color swatches 604. As shown, the color palate 602 is similar to color palate 410, shown in FIG. 4. However in other examples the color palates 602 and 410 may have different color swatches.

The user 400 is shown selecting one of the color swatches 604 in the color palate 602 via a hand gesture of the hand 413. Again the graphical representation 414 of the hand 413 is presented via a hologram to enable a user to select distant objects in the real world three-dimensional environment 404.

Figure 7:
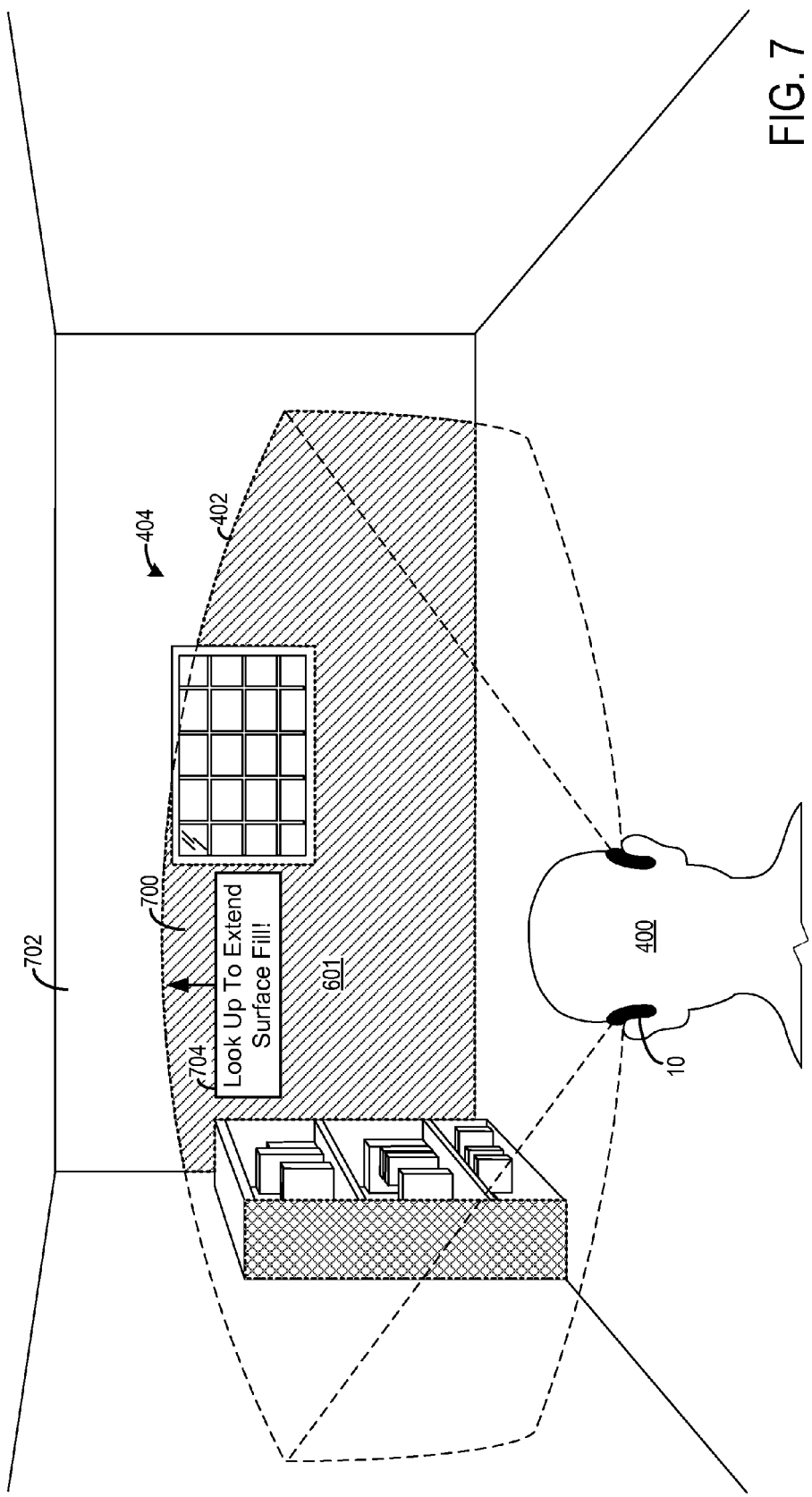

In response to selecting the color swatch a fill hologram 700 having a predetermined color corresponding to the color swatch selected in FIG. 6 is presented via the display of the head-mounted computing device 10, as shown in FIG. 7. The fill hologram 700 has a shape that conforms to the shape of the fill-eligible surface 601. Moreover, the fill hologram 700 is world-lock to overlay the fill-eligible surface 601 regardless of a user's perspective.

In the depicted example, the fill-eligible surface 601 is identified as a partial surface. For instance, the fill-eligible surface 601 and therefore fill hologram 700 only extends across a portion of a wall 702. In such an example the wall is the actual whole surface. The partial surface may be identified via the method described above, which determines that portions of the boundary of the identified surface, particularly along its top sides on either side of the depicted window, and on its right side above the floor, are not defined by a difference in color parameters of greater than a threshold, but rather are defined by the intersection of the color parameter defined surface and the edge of the field of view of the camera capturing the image. Simply put, because the boundary of the eligible surface extends to an edge of the field of view 402 of the three-dimensional environment 400, the surface may be identified as a partial surface. Further, pixel depth information, and the shape and/or size of the boundary of the fill-eligible surface may also inform the determination that this is a partial surface.

A visual cue 704 prompting the user to extend the boundary of the fill hologram 700 may be presented to the user via the head-mounted computing device 10. As shown, the visual cue prompts the user to alter the field of view 402 such that it encompasses the remainder of the surface. Additionally or alternatively, an audio cue may be provided to prompt the user to extend the boundary of the fill hologram. In another example, the boundary of the fill hologram may be implemented automatically, without necessitating user confirmation.

Figure 8:
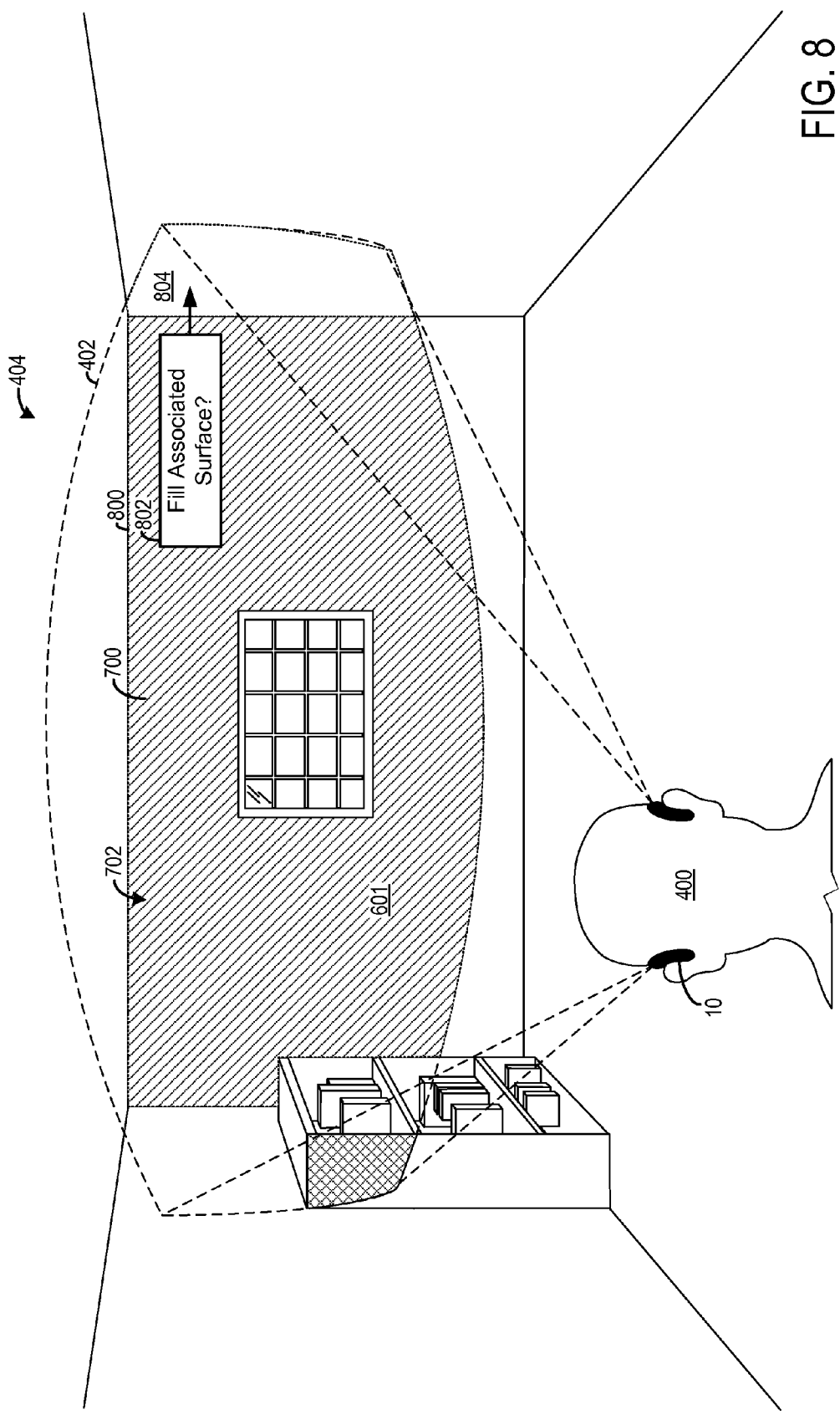

A user may then adjust the field of view 402 of the real-world three-dimensional environment in response to viewing the visual cue 704 as shown in FIG. 8. The field of view 402 now encompasses the upper portion of the wall 702. The boundary 800 of the fill hologram 700 as well as fill-eligible surface 601 are each extended to encompass the upper portion of the wall. As a result, the boundary of the fill hologram may be adjusted to fill portions of a surface that are not previously viewed through the holographic display of the head-mounted computing device 10. As a result, complete environmental surfaces can be identified and color filled via a hologram.

FIG. 8 also shows a visual cue 802 prompting the user to fill another fill-eligible surface 804 associated with the fill-eligible surface 601. It will be appreciated that the fill-eligible surface 804 may be filled via a fill hologram having the same color as the fill hologram 702 in response to user input selecting fill operation. The associated surfaces are adjacent walls in the room. In this way, walls in the room can be quickly filled with the same color to enable a user to rapidly test different paint colors on corresponding surfaces in the room. In other examples, the associated fill-eligible surface may be spaced away from one another. Still further in another example, a user setting may be provided to enable the user to choose to have associated surfaces automatically filled by programmatically generated fill requests for those associated surfaces. In this manner, associated surfaces may be color filled by default, without necessitating direct user input.

Figure 9:
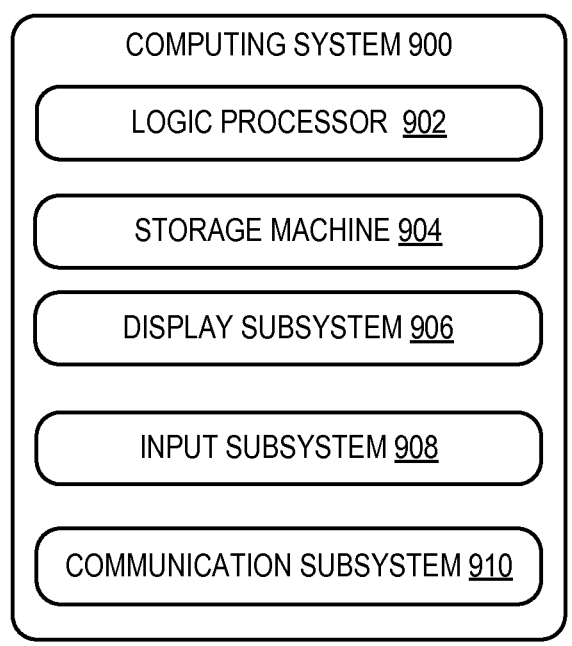
FIG. 9 shows a schematic depiction of an example computing system that may be used to as the head-mounted computing device of FIG. 1, and to implement the methods described herein.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. It will be appreciated that computing system 900 may take the form of head mounted computing device 10 described above, as well as other computing devices with which the head mounted computing device 10 is configured to communicate.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold or store instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In another example, a method for operating a head-mounted computing device is provided. The method includes capturing an image of a three-dimensional environment external to the head-mounted computing device, the captured image including at least a portion of a field of view of a user through an at least partially see-through display of the head-mounted computing device, identifying a surface within the captured image that is eligible for color fill operation, based on similarities in color parameters of contiguous pixels in the captured image, receiving a color fill request via user input at the head-mounted computing device, the request being for a predetermined color, and performing a color fill operation on the identified surface in response to receiving the color fill request by (a) generating a fill hologram having the predetermined color and a shape that conforms to the shape of the identified surface, (b) displaying the fill hologram in a world-locked manner so as to overlay the identified surface as viewed through the see-through holographic display of the head-mounted display device.

In such an example, the color parameters may include one or more of hue, brightness, and saturation.

In such an example, identifying the surface may include determining a variance in one or more of the color parameters across a region in the captured image and the surface may be identified based on a variance threshold of each of the one or more of the color parameters.

In such an example, pixel depth information may be used to identify the surface within the captured image.

In such an example, the method may further include determining if the first identified surface is a partial surface, and if the first identified surface is a partial surface, then extending a boundary of the fill hologram to a surface extension region adjacent to the identified surface in response to receiving a surface extension input.

In such an example, the surface extension input may be at least one of a change in the field of view of the see-through display and a user input.

In such an example the method may further include, prior to performing the color fill operation, displaying a color palate hologram including a plurality of different color swatches on the see-through holographic display, one of the plurality of different color swatches having the predetermined color.

In such an example, the method may further include, prior to performing the color fill operation, altering the colors of the plurality of color swatches in the color palate hologram.

In such an example the method may further include, prior to receiving the color fill request, displaying on the see-through holographic display an eligible fill surface hologram visually indicating eligibility of the identified surface for color fill operation.

In such an example, the method may further include identifying a second surface spaced away from the first surface in the captured image, determining if the second identified surface is associatively linked to the first surface based on similarities in color parameters of pixels in the first and second surfaces and location data of the pixels in the first and second surfaces, and if the second identified surface is associatively linked to the first identified surface, then performing a second color fill operation on the second identified surface in response to receiving a second color fill request by (a) generating a second fill hologram having the predetermined color and a shape that conforms with the shape of the second identified surface, (b) displaying the second fill hologram on the see-through holographic display.

In such an example, the first surface may be associatively linked to the first surface based on color parameters and positioning information.

In another example, a head-mounted computing device is provided. The head-mounted computing device includes an at least partially see-through holographic display configured to present holographic images overlying a user's perspective of a three-dimensional environment external to the head-mounted display, instructions stored in memory executable by a processor to: capture an image of a three-dimensional environment external to the head-mounted computing device, the captured image including at least a portion of a field of view of a user through a see-through display of the head-mounted computing device, identify a surface within the captured image that is eligible for color fill operation, based on similarities in color parameters of contiguous pixels in the captured image, receive a color fill request via user input at the head-mounted computing device, the request being for a predetermined color, and perform a color fill operation on the identified surface in response to receiving the color fill request by (a) generating a fill hologram having the predetermined color and a shape that conforms to the shape of the identified surface, (b) displaying the fill hologram in a world-locked manner so as to overlay the identified surface as viewed through the see-through holographic display of the head-mounted display device.

In such an example, the head-mounted computing device may further include instructions stored in memory executable by a processor to extend a boundary of the fill hologram when it is determined that the identified surface is a partial surface.

In such an example, the head-mounted computing device may further include instructions stored in memory executable by a processor to identify a second surface associatively linked to the first identified surface and perform a second color fill operation on the second identified surface in response to receiving a second color fill request by (a) generating a second fill hologram having the predetermined color and a shape that conforms with the shape of the second identified surface, (b) displaying the second fill hologram on the see-through holographic display.

In such an example, the predetermined color may correspond to a color in a color palate having a plurality of different colors.

In another example, a method for operating a head-mounted computing device is provided. The method includes capturing an image of a three-dimensional environment external to the head-mounted computing device, the captured image including at least a portion of a field of view of a user through a see-through display of the head-mounted computing device, identifying a surface within the captured image that is eligible for color fill operation, based on similarities in color parameters of contiguous pixels in the captured image, the color parameters including hue, brightness, and saturation, receiving a color fill request via user input at the head-mounted computing device, the request being for a predetermined color, and performing a color fill operation on the identified surface in response to receiving the color fill request by (a) generating a fill hologram having the predetermined color and a shape that conforms to the shape of the identified surface, (b) displaying the fill hologram in a world-locked manner so as to overlay the identified surface as viewed through the see-through holographic display of the head-mounted display device.

In such an example the method may further include extending a boundary of the fill hologram when it is determined that the identified surface is a partial surface.

In such an example the boundary may be automatically extended in response to a change in a field of view of the see-through holographic display.

In such an example the boundary may be extended in response to a user input.

In such an example, identifying the surface may include determining a variance in the color parameters across a region in the captured image and the surface may be identified based on a variance threshold of each of the color parameters.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for operating a head-mounted computing device, comprising:
   capturing an image of a three-dimensional environment external to the head-mounted computing device, the captured image including at least a portion of a field of view of a user through an at least partially see-through display of the head-mounted computing device;
   identifying a first surface within the captured image that is eligible for color fill operation, based on similarities in color parameters of contiguous pixels in the captured image;
   receiving a color fill request via user input at the head-mounted computing device, the request being for a predetermined color; and
   performing a color fill operation on the identified first surface in response to receiving the color fill request by (a) generating a holographic overlay including a virtual object having the predetermined color and a shape with a boundary that conforms to the shape of the first identified surface, (b) displaying, through an image production system, the holographic overlay in a world-locked manner so as to overlay the first identified surface as viewed through the see-through holographic display of the head-mounted display device so that the virtual object remains in a fixed position relative to the identified first surface even when the perspective of the head mounted computing device changes.

2. The method of claim 1, where the color parameters include one or more of hue, brightness, and saturation.

3. The method of claim 2, where identifying the first surface includes determining a variance in one or more of the color parameters across a region in the captured image and the first surface is identified based on a variance threshold of each of the one or more of the color parameters.

4. The method of claim 1, where pixel depth information is used to identify the first surface within the captured image.

5. The method of claim 1, further comprising:
   determining if the first identified surface is a partial surface; and
   if the first identified surface is a partial surface, then extending the boundary of the holographic overlay to a surface extension region adjacent to the first identified surface in response to receiving a surface extension input.

6. The method of claim 5, wherein the surface extension input is at least one of a change in the field of view of the see-through display and a user input.

7. The method of claim 1, further comprising, prior to performing the color fill operation, displaying a hologram color palette including a plurality of different color swatches on the see-through holographic display, one of the plurality of different color swatches having the predetermined color.

8. The method of claim 7, further comprising, prior to performing the color fill operation, altering the colors of the plurality of color swatches in the hologram color palette.

9. The method of claim 1, further comprising, prior to receiving the color fill request, displaying on the see-through holographic display an eligible fill surface hologram visually indicating eligibility of the first identified surface for color fill operation.

10. The method of claim 1, further comprising:
    identifying a second surface spaced away from the first surface in the captured image;
    determining if the second identified surface is associatively linked to the first surface based on similarities in color parameters of pixels in the first and second surfaces and location data of the pixels in the first and second surfaces; and
    if the second identified surface is associatively linked to the first identified surface, then performing a second color fill operation on the second identified surface in response to receiving a second color fill request by (a) generating a second holographic overlay having the predetermined color and a shape that conforms with the shape of the second identified surface, (b) displaying the second holographic overlay on the see-through holographic display.

11. The method of claim 10, where the second surface is associatively linked to the first surface based on color parameters and positioning information.

12. A head-mounted computing device comprising:
    an at least partially see-through holographic display configured to present holographic images overlaying a user's perspective of a three-dimensional environment external to the head-mounted computing device;
    instructions stored in memory executable by a processor to:
      capture an image of a three-dimensional environment external to the head-mounted computing device, the captured image including at least a portion of a field of view of a user through a see-through display of the head-mounted computing device;
      identify a first surface within the captured image that is eligible for color fill operation, based on similarities in color parameters of contiguous pixels in the captured image;
      receive a color fill request via user input at the head-mounted computing device, the request being for a predetermined color; and
      perform a color fill operation on the identified first surface in response to receiving the color fill request by (a) generating a holographic overlay including a virtual object having the predetermined color and a shape with a boundary that conforms to the shape of the first identified surface, (b) displaying, through an image production system, the holographic overlay in a world-locked manner-so as to overlay the identified first surface as viewed through the see-through holographic display of the head-mounted display device so that the virtual object remains in a fixed position relative to the identified first surface even when the perspective of the head mounted computing device changes.

13. The head-mounted computing device of claim 12, further comprising instructions stored in memory executable by a processor to extend a boundary of the holographic overlay when it is determined that the identified first surface is a partial surface.

14. The head-mounted computing device of claim 12, further comprising instructions stored in memory executable by a processor to identify a second surface associatively linked to the first identified surface and perform a second color fill operation on the second identified surface in response to receiving a second color fill request by (a) generating a second holographic overlay having the predetermined color and a shape that conforms with the shape of the second identified surface, (b) displaying the second holographic overlay on the see-through holographic display.

15. The head-mounted computing device of claim 12, wherein the predetermined color corresponds to a color in a color palette having a plurality of different colors.

16. A method for operating a head-mounted computing device comprising:

capturing an image of a three-dimensional environment external to the head-mounted computing device, the captured image including at least a portion of a field of view of a user through a see-through display of the head-mounted computing device;

identifying a surface within the captured image that is eligible for color fill operation, based on similarities in color parameters of contiguous pixels in the captured image, the color parameters including hue, brightness, and saturation;

receiving a color fill request via user input at the head-mounted computing device, the request being for a predetermined color; and performing a color fill operation on the first identified surface in response to receiving the color fill request by (a) generating a holographic overlay including a virtual object having the predetermined color and a shape with a boundary that conforms to the shape of the first identified surface, (b) displaying the holographic overlay in a world-locked manner so as to overlay the first identified surface as viewed through the see-through holographic display of the head-mounted display device so that the virtual object remains in a fixed position relative to the identified first surface even when the perspective of the head mounted computing device changes.

17. The method of claim 16, further comprising extending a boundary of the holographic overlay when it is determined that the first identified surface is a partial surface.

18. The method of claim 17, wherein the boundary is automatically extended in response to a change in a field of view of the see-through holographic display.

19. The method of claim 17, wherein the boundary is extended in response to a user input.

20. The method of claim 16, wherein identifying the surface includes determining a variance in the color parameters across a region in the captured image and the surface is identified based on a variance threshold of each of the color parameters.

* * * * *